Patented Oct. 6, 1953

2,654,728

UNITED STATES PATENT OFFICE 2,654,728

COPOLYMERS OF VINYLIDENE CYANIDE WITH DIFLUORODICHLOROETHYLENES

Harry Gilbert, Cuyahoga Falls, and Floyd F. Miller, Wadsworth, Ohio, assignors to The B. F. Goodrich Company, New York, N. Y., a corporation of New York No Drawing. Application June 24, 1952, Serial No. 295,349

7 Claims. (Cl. 260—78.5)

This invention relates to novel copolymers of vinylidene cyanide with difluorodichloroethylenes and the preparation thereof, which copolymers are extremely useful resinous materials.

In U. S. Patents 2,476,270 and 2,502,412 to Alan E. Ardis, and 2,514,387 to Harry Gilbert, novel methods for preparing monomeric vinylidene cyanide are disclosed. U. S. Patent 2,589,294 to Richard F. Schmidt et al. discloses the preparation of useful homopolymers of vinylidene cyanide.

Monomeric vinylidene cyanide is a clear liquid at room temperature and a crystalline solid at 0° C. It melts in the range of 6.0° C. to 9.7° C., depending upon purity, with the purest samples melting at 9.0° C. to 9.7° C., and it boils at 40° C. at a reduced pressure of 5 mm. of mercury. It is quite unstable because of its extreme sensitivity to water, undergoing on contact with water at room temperature an instantaneous homopolymerization reaction to give a solid, water-insoluble resin. When the monomer is allowed to stand at room temperature in admixture with 1,3-butadiene, it reacts therewith to give solid 4,4-dicyanocyclohexene.

It has now been discovered that monomeric vinylidene cyanide having the above physical and chemical characteristics will copolymerize with difluorodichloroethylenes in the presence of a free radical initiator to give new and highly useful copolymers.

The difluorodichloroethylenes, 1,1-difluoro-2,2-dichloroethylene and 1,2-difluoro-1,2-dichloroethylene, do not readily polymerize to form solid polymers when heated with a peroxide initiator. If monomeric vinylidene cyanide is also present, however, according to this invention, copolymerization occurs quite readily in the presence of peroxygen initiators to form highly useful resinous copolymers. The unsymmetrical difluorodichloroethylene, 1,1-difluoro-2,2-dichloroethylene is preferred because it copolymerizes at a faster rate than symmetrical 1,2-difluoro-1,2-dichloroethylene.

The polymerization reaction may be carried out in several different ways. For example, one preferred method consists in heating a mixture of the monomers and polymerization initiator, without using a solvent or other liquid medium for the monomers, to effect the copolymerization. The copolymerization occurs readily at temperatures from about 20° C. to 100° C., the copolymer generally forming as a hard, white resinous powder of small particle size.

Another method of polymerization consists of first dissolving the vinylidene cyanide and difluorodichloroethylene in benzene or other liquid aromatic solvent such as, toluene, methyl toluene, trichlorobenzene and the like which is preferably free from impurities which initiate the ionic polymerization of the vinylidene cyanide monomer and in an amount such that the solvent comprises approximately 30% to 80% by weight of the total solution. A polymerization initiator is included in the solution and the resulting mixture is maintained at the desired temperature whereupon copolymerization occurs to form the desired copolymer. The copolymer thus formed may be separated from the polymerization medium by filtering, or, if desired, the solvent may be removed by an evaporation process.

The polymerization may be effected at temperatures as low as 0° C. or lower, or as high as 100° C. or higher, provided that an initiator is utilized which will dissociate into free radicals at the polymerization temperature.

The relative amounts of vinylidene cyanide and difluorodichloroethylene in any polymerization charge are not critical since a useful copolymer is obtained regardless of the amount of either comonomer in the charge. The amount of vinylidene cyanide in the monomer charge may be as low as 0.1 mol per cent or as high as 99 mol per cent while still obtaining copolymers markedly different in properties from homopolymers of either vinylidene cyanide or difluorodichloroethylene.

Regardless of the polymerization method or monomer ratio utilized, the polymerization is preferably stopped before either of the monomers is entirely consumed in order that a true copolymer will be obtained. It is often desirable to add to the polymerization mixture during the course of the copolymerization reaction, continuously or intermittently, fresh quantities of one or both monomers and also of initiator and solvent if desired, thus taking full advantage of the combining ratio of the monomers and the capacity of the equipment, and in effect operating a continuous or semi-continuous process.

The initiator which is employed in the polymerization process is preferably a peroxygen compound, such as silver peroxide, the perborates, the percarbonates, benzoyl peroxide, caproyl peroxide, lauroyl peroxide, acetone peroxide, acetyl benzoyl peroxide, cumene hydroperoxide, o,o'-dichlorobenzoyl peroxide, 2,4-dichlorobenzoyl peroxide, o,o'-dibromobenzoyl peroxide, caprylyl peroxide, pelargonyl peroxide, tertiary butyl hydroperoxide, tetralin peroxide and the like. In general, from 0.01% to 2.0% by weight of the initiator, based on the weight of the monomers is employed, although larger or smaller quantities may be used if desired.

The following examples illustrates the preparation of copolymers of vinylidene cyanide with difluorodichloroethylene in accordance with this invention, but are not to be construed as a limitation upon the scope thereof, for there are of course, many possible variations and modifications.

Examples 1 through 4

A series of three copolymers of vinylidene cyanide with 1,1-difluoro-2,2-dichloroethylene are prepared by mixing varying amounts of both monomers with 0.2% (based on the total weight of monomers) of o,o'-dichlorobenzoyl peroxide and 20 volume per cent of benzene in a reaction vessel, blanketing the mixture with nitrogen, sealing the reaction vessel and maintaining the resulting mixture at a temperature of about 40° C. for a period of about 24 hours. A fourth polymerization is prepared with no initiator. The ratios of reactants employed are tabulated in the following table.

| Example | 1 | 2 | 3 | 4 |
|---|---|---|---|---|
| Mol percent vinylidene cyanide | 70 | 50 | 30 | 50 |
| Weight in grams of vinylidene cyanide | 12.0 | 8.0 | 5.0 | |
| Mol percent 1,1-difluoro-2,2-dichloroethylene | 30 | 50 | 70 | 50 |
| Weight in grams of 1,1-difluoro-2,2-dichloroethylene | 8.7 | 13.5 | 19.7 | |
| Volume percent benzene | 20 | 20 | 20 | 20 |
| Volume in ml. benzene | 5.2 | 5.4 | 6.2 | |
| Weight percent o,o'-dichlorobenzoyl peroxide | 0.2 | 0.2 | 0.2 | 0 |
| Weight in milligrams o,o'-dichlorobenzoyl peroxide | 41.4 | 43.0 | 49.4 | |

The polymerization reactions in Examples 1, 2 and 3 result in solid hard resinous copolymers of vinylidene cyanide and 1,1-difluoro-2,2-dichloroethylene. No polymerization occurs in Example 4 which does not have initiator present.

When 1,2-difluoro-1,2-dichloroethylene is substituted for 1,1-difluoro-2,2-dichloroethylene in the above examples, solid resinous copolymers are obtained but the copolymerization reaction is much slower than those of the given examples. Likewise, when the polymerization is carried out according to other of the methods disclosed hereinbefore or when utilizing other of the peroxygen catalysts disclosed, excellent results are achieved.

The copolymers prepared according to the method of the present invention are extremely useful resinous materials. For example, they may be utilized in the melt or solvent spinning of excellent filaments and in the preparation of films as well as for many other uses.

Although specific examples of the invention have been herein described, it is not intended to limit the invention solely thereto, but to include all of the variations and modifications falling within the spirit and scope of the appended claims.

We claim:

1. A two component copolymer of vinylidene cyanide with a difluorodichloroethylene, the vinylidene cyanide units in said copolymer being derived from monomeric vinylidene cyanide which is a crystalline solid at 0° C., having a melting point when in purest form of substantially 9.0° C. to 9.7° C. and being characterized chemically by the ability to undergo on contact with water at room temperature an instantaneous homopolymerization reaction to give a solid water-insoluble resin.

2. A two component copolymer of vinylidene cyanide with 1,1-difluoro-2,2-dichloroethylene, the vinylidene cyanide units in said copolymer being derived from monomeric vinylidene cyanide which is a crystalline solid at 0° C., having a melting point when in purest form of substantially 9.0° C. to 9.7° C. and being characterized chemically by the ability to undergo on contact with water at room temperature an instantaneous homopolymerization reaction to give a solid water-insoluble resin.

3. A two component copolymer of vinylidene cyanide with 1,2-difluoro-1,2-dichloroethylene, the vinylidene cyanide units in said copolymer being derived from monomeric vinylidene cyanide which is a crystalline solid at 0° C., having a melting point when in purest form of substantially 9.0° C. to 9.7° C. and being characterized chemically by the ability to undergo on contact with water at room temperature an instantaneous homopolymerization reaction to give a solid water-insoluble resin.

4. The method which comprises mixing together monomeric vinylidene cyanide, which is liquid at room temperature and a crystalline solid at 0° C., having a melting point when in purest form of substantially 9.0° C. to 9.7° C. and is characterized chemically by the ability to undergo on contact with water at room temperature an instantaneous homopolymerization reaction to give a solid, water-insoluble resin, and a difluorodichloroethylene, in the presence of a peroxygen catalyst, whereupon polymerization occurs to form a two component copolymer of vinylidene cyanide and said difluorodichloroethylene.

5. The method which comprises mixing together monomeric vinylidene cyanide, which is liquid at room temperature and a crystalline solid at 0° C., having a melting point when in purest form of substantially 9.0° C. to 9.7° C. and is characterized chemically by the ability to undergo on contact with water at room temperature an instantaneous homopolymerization reaction to give a solid, water-insoluble resin, and 1,1-difluoro-2,2-dichloroethylene, in the presence of a peroxygen catalyst, whereupon polymerization occurs to form a two component copolymer of vinylidene cyanide and said 1,1-difluoro-2,2-dichloroethylene.

6. The method which comprises mixing together monomeric vinylidene cyanide, which is a liquid at room temperature and a crystalline solid at 0° C., having a melting point when in purest form of substantially 9.0° C. to 9.7° C. and is characterized chemically by the ability to undergo on contact with water at room temperature an instantaneous homopolymerization reaction to give a solid, water-insoluble resin, and 1,1-difluoro-2,2-dichloroethylene, and maintaining the mixture at a temperature of from 20° C. to 100° C., in the presence of a peroxygen catalyst, whereupon polymerization occurs to form a two component copolymer of vinylidene cyanide and said 1,1-difluoro-2,2-dichloroethylene.

7. The method of claim 6 wherein the peroxygen catalyst is o,o'-dichlorobenzoyl peroxide.

HARRY GILBERT.
FLOYD F. MILLER.

References Cited in the file of this patent

UNITED STATES PATENTS

| Number | Name | Date |
|---|---|---|
| 2,466,395 | Dickey | Apr. 5, 1949 |